(12) United States Patent
Shikida et al.

(10) Patent No.: US 9,005,568 B2
(45) Date of Patent: Apr. 14, 2015

(54) PROCESS FOR PRODUCTION OF POWDER OF PEROVSKITE COMPOUND

(75) Inventors: Takashi Shikida, Sakai (JP); Shinji Ogama, Iwaki (JP); Yoshiaki Ikeda, Iwaki (JP); Kazuhisa Hidaka, Sakai (JP)

(73) Assignee: Sakai Chemical Industry Co., Ltd., Osaka (JP)

(*) Notice: Subject to any disclaimer, the term of this patent is extended or adjusted under 35 U.S.C. 154(b) by 792 days.

(21) Appl. No.: 11/660,231

(22) PCT Filed: Feb. 9, 2005

(86) PCT No.: PCT/JP2005/002387
§ 371 (c)(1),
(2), (4) Date: Feb. 13, 2007

(87) PCT Pub. No.: WO2006/016428
PCT Pub. Date: Feb. 16, 2006

(65) Prior Publication Data
US 2008/0044344 A1 Feb. 21, 2008

(30) Foreign Application Priority Data
Aug. 13, 2004 (JP) .................................. 2004-236105

(51) Int. Cl.
C01G 23/04 (2006.01)
C04B 35/622 (2006.01)
(Continued)

(52) U.S. Cl.
CPC ............ *C01G 23/003* (2013.01); *C01G 23/006* (2013.01); *C01G 25/00* (2013.01);
(Continued)

(58) Field of Classification Search
USPC ................ 501/137; 252/315; 423/598, 592.1, 423/593.1, 594.12, 594.16, 608, 619
See application file for complete search history.

(56) References Cited

U.S. PATENT DOCUMENTS 4,643,984 A * 2/1987 Abe et al. ...................... 501/134
4,927,560 A    5/1990 Osaka et al.
(Continued)

FOREIGN PATENT DOCUMENTS

JP    1-103904 A    4/1989
JP    3-174355 A    7/1991
(Continued)

OTHER PUBLICATIONS mori et al Jp63252927 abstract.*
(Continued)

*Primary Examiner* — Jun Li
(74) *Attorney, Agent, or Firm* — Hamre, Schumann, Mueller & Larson, P.C.

(57) ABSTRACT

The invention provides a process for production of powder of perovskite compound which comprises:
the first step for obtaining an aggregate of perovskite compound which comprises at least one A group element selected from the group consisting of Mg, Ca, Sr, Ba and Pb and at least one B group element selected from the group consisting of Ti, Zr, Hf and Sn, and which is represented by the general formula
$ABO_3$ wherein A is at least one A group element and B is at least one B group element; and
the second step for heating the aggregate of perovskite compound obtained in the first step in a solvent at a temperature in a range from 30° C. to 500° C. whereby disintegrating the aggregate.

The process makes it unnecessary to resort to a conventional mechanical crushing means or to make use of impact caused by milling media or airflow, but it makes possible to obtain a powder of perovskite compound which is not contaminated with impurities derived from milling media or chipping particles but has a high purity and a narrow particle size distribution.

7 Claims, 11 Drawing Sheets

(51) Int. Cl.
*C01G 23/00* (2006.01)
*C01G 25/00* (2006.01)
*C01G 27/00* (2006.01)
*C04B 35/465* (2006.01)
*C04B 35/468* (2006.01)
*C04B 35/47* (2006.01)
*C04B 35/48* (2006.01)
*C04B 35/49* (2006.01)
*C04B 35/626* (2006.01)
*H01B 3/12* (2006.01)

(52) U.S. Cl.
CPC ............. *C01G 25/006* (2013.01); *C01G 27/00* (2013.01); *C01P 2002/34* (2013.01); *C04B 35/465* (2013.01); *C04B 35/4682* (2013.01); *C04B 35/47* (2013.01); *C04B 35/48* (2013.01); *C04B 35/49* (2013.01); *C04B 35/62655* (2013.01); *C04B 2235/3201* (2013.01); *C04B 2235/3205* (2013.01); *C04B 2235/3206* (2013.01); *C04B 2235/3208* (2013.01); *C04B 2235/3213* (2013.01); *C04B 2235/3215* (2013.01); *C04B 2235/3236* (2013.01); *C04B 2235/3249* (2013.01); *C04B 2235/441* (2013.01); *C04B 2235/449* (2013.01); *C04B 2235/5409* (2013.01); *C04B 2235/5436* (2013.01); *C04B 2235/5445* (2013.01); *C04B 2235/5472* (2013.01); *C04B 2235/5481* (2013.01); *C04B 2235/72* (2013.01); *C04B 2235/724* (2013.01); *C04B 2235/768* (2013.01); *H01B 3/12* (2013.01)

(56) References Cited

U.S. PATENT DOCUMENTS

| | | | | |
|---|---|---|---|---|
| 5,084,424 | A | * | 1/1992 | Abe et al. ...................... 501/137 |
| 5,112,433 | A | * | 5/1992 | Dawson et al. ............ 423/593.1 |
| 5,229,101 | A | * | 7/1993 | Watanabe et al. .............. 423/598 |
| 6,117,498 | A | * | 9/2000 | Chondroudis et al. ........ 427/590 |
| 6,197,719 | B1 | * | 3/2001 | Choudhary et al. .......... 502/300 |
| 2002/0035035 | A1 | * | 3/2002 | Kirchnerova et al. ........ 502/324 |
| 2004/0188002 | A1 | * | 9/2004 | Kawamura et al. ........ 156/89.16 |

FOREIGN PATENT DOCUMENTS

| | | |
|---|---|---|
| JP | 5-24845 A | 2/1993 |
| JP | 5-178617 A | 7/1993 |
| JP | 5-330824 A | 12/1993 |
| JP | 2003-212543 A | 7/2003 |
| JP | 2004-137115 A | 5/2004 |

OTHER PUBLICATIONS

International Search Report of PCT/JP2005/002387, dated May 17, 2005.

Sasaki. "Method and Process for Producing Barium Titanate and Its Composite Particle." Journal of the Society of Power Technology, vol. 34(11), 1997, pp. 862-874.

Society of Powder Technology, Japan (ed,). Crushing, Sizing and Surface Modification, Chapter 5: Crusher. 2001, pp. 99-122.

* cited by examiner

PROCESS FOR PRODUCTION OF POWDER OF PEROVSKITE COMPOUND

TECHNICAL FIELD

The invention relates to a process for production of powder of perovskite compound. More particularly, the invention relates to a process for disintegrating by heating in a solvent an aggregate of perovskite compound formed by aggregation, fusion-bonding or sintering caused by heat treatment during the course of production thereof, whereby powder of perovskite compound free from chipping particles, having a narrow particle size distribution and a high purity can be obtained.

BACKGROUND ART

In general, perovskite compounds refer to compounds having similar crystalline structure to that of calcium titanate mineral (perovskite). By molding and sintering such compounds, dielectric ceramics having dielectricity, piezoelectricity and semiconductive property can be obtained. Recently, such ceramics are widely used for capacitors, transmission filters, piezoelectric elements, thermistor, etc. for electric devices such as telecommunication devices and computer machines.

As described in Journal of Powder Technology, Vol. 34, No. 11, page 32, Kyoichi Sasaki, "Barium titanate, and process for production and process of the complex particles thereof" (1997), a solid phase process is well-known as a typical process for production of such perovskite compounds. For example, barium titanate, which is a typical example of perovskite compounds, is produced by a solid phase process in which barium carbonate and titanium oxide are heated to a temperature of 1000° C. or more to provide barium titanate. In such a solid phase process, the thus formed particles of barium titanate are aggregated each other so that the barium titanate is obtained as a fusion-bonded aggregate. Therefore, particles of barium titanate having a desired average particle size are conventionally obtained by crushing the aggregate by a mechanical crushing means, a media mill, or an airflow crusher.

As described in the Society of Powder Technology, Japan, ed. "Crushing, Sizing and Surface Modification", page 99 (published in 2001), examples of the mechanical crushing means include, for example, a roll mill, a hammer mill, and a pin mill, among others, and examples of the media mill include, for example, a ball mill, a tube mill, a conical mill, a vibration mill, a tower mill, an atritor, a visco mill, a sand mill, and an annular mill, among others. Examples of the airflow crusher include, for example, a jet mill.

However, when a mechanical crushing means is used, the obtained powder is low in crushing degree. On the other hand, when a media mill is used, impurities are generated by abrasion of grinding media such as alumina, zirconia or agate jasper, or microparticles or chipping particles are generated by excess crushing and grinding of barium titanate by grinding media, and they contaminate the resulting powder of barium titanate. Therefore, the thus obtained powder of barium titanate has neither a satisfactory purity nor a satisfactory particle size distribution. Accordingly, a process using grinding media mainly formed of barium titanate has been suggested, as described in JP-A-03-174355 so that the resulting powder of barium titanate is not contaminated with impurities derived from grinding media, but it is still unavoidable that the resulting powder of barium titanate is contaminated with chipping particles.

As an alternative process for production of barium titanate powder, a wet process such as an alkoxide process, an organic acid salt process, a hydrothermal process, or a sol-gel process is also known. However, in the organic acid salt process and the sol-gel process, raw materials are reacted under heating to form an aggregate of barium titanate, and accordingly, it is necessary to crush the obtained aggregate of barium titanate, similarly to the solid phase process. Thus, also in these processes, it is unavoidable that the obtained powder of barium titanate is contaminated with impurities or chipping particles, as mentioned above.

On the other hand, as described in JP-A-05-330824, barium titanate can be directly synthesized by an alkoxide process and a hydrothermal process. However, these processes involve heat treatment to allow metamorphosis to a tetragonal system and to enlarge the particle size to some extent in view of practical need. Consequently, since also the thus formed barium titanate is obtained as an aggregate, these processes need a step for crushing the aggregate. Accordingly, also in the alkoxide process and the hydrothermal process, it is unavoidable that the obtained powder of barium titanate is contaminated with impurities or chipping particles.

As described above, according to the conventional process for production of powder of perovskite compound, the perovskite compound is obtained as an aggregate, and even when such an aggregate is crushed using a conventional mechanical crushing means, the aggregate is not crushed to a high degree. Then, when a media mill is used for crushing an aggregate to obtain a powder having a desired average particles size, it is unavoidable that the resulting powder is contaminated with impurities derived from chipping particles or grinding media. In turn, when an airflow crushing process is used, the particles of perovskite compound in the aggregate become distorted by impact of airflow during the treatment so that the obtained powder of perovskite compound does not necessarily have satisfying properties for obtaining homogeneous dielectric ceramics. Thus, there arises a problem, for example, that it cannot meet sufficiently to the demand for miniaturization and high performance of electronic parts such as capacitors, filters, thermistors, etc.

The invention has been accomplished to solve the above-mentioned problems involved in the production of powder of perovskite compound. It is an object of the invention to provide a process for production of powder of perovskite compound of which process provides a high purity powder of perovskite compound containing no impurities derived from grinding media or chipping particles, without resorting to impact caused by grinding media or airflow to crush an aggregate of perovskite compound.

SUMMARY OF THE INVENTION

The invention provides a process for production of powder of perovskite compound which comprises:

the first step for obtaining an aggregate of perovskite compound which comprises at least one A group element selected from the group consisting of Mg, Ca, Sr, Ba and Pb and at least one B group element selected from the group consisting of Ti, Zr, Hf and Sn, and which is represented by the general formula $$ABO_3$$

wherein A is at least one A group element and B is at least one B group element; and the second step for heating the aggregate of perovskite compound obtained in the first step in a solvent at a temperature in a range from 30° C. to 500° C. whereby disintegrating the aggregate.

The process of the invention for production powder of perovskite compound comprises the first step and the second step. Preferably, the first step is such one as mentioned below.

(1) When a hydrothermal process is employed, the first step is to obtain an aggregate of perovskite compound by hydrothermal treating a mixture of a hydroxide of at least one A group element selected from the group consisting of Mg, Ca, Sr, Ba and Pb and an oxide and/or a hydroxide of at least one B group element selected from the group consisting of Ti, Zr, Hf and Sn at a temperature in a range from 100° C. to 300° C. in the presence of an aqueous medium and then heating the obtained reaction product at a temperature in a range from 100° C. to 1400° C. to provide an aggregate of perovskite compound.

(2) When a solid phase process is employed, the first step is to obtain an aggregate of perovskite compound by heating a mixture of an oxide of at least one A group element selected from the group consisting of Mg, Ca, Sr, Ba and Pb and/or a compound that forms the oxide by heating, and an oxide of at least one B group element selected from the group consisting of Ti, Zr, Hf and Sn and/or a compound that forms the oxide by heating, at a temperature in a range from 600° C. to 1400° C. to provide an aggregate of perovskite compound.

(3) When an organic acid salt process is employed, the first step is to form a double salt using a water-soluble salt of at least one A group element selected from the group consisting of Mg, Ca, Sr, Ba and Pb, a water-soluble salt of at least one B group element selected from the group consisting of Ti, Zr, Hf and Sn, and at least one organic acid selected from the group consisting of oxalic acid and citric acid, and then heating the double salt at a temperature in a range from 400° C. to 1400° C. to provide an aggregate of perovskite compound.

(4) When an alkoxide process is employed, the first step is to obtain an aggregate of perovskite compound by hydrolyzing a mixture of an alkoxide and/or a hydroxide of at least one A group element selected from the group consisting of Mg, Ca, Sr, Ba and Pb, and an alkoxide of at least one B group element selected from the group consisting of Ti, Zr, Hf and Sn, and then heating the obtained reaction product at a temperature in a range from 100° C. to 1400° C. to provide an aggregate of perovskite compound.

(5) When a sol-gel process is employed, the first step is to obtain an aggregate of perovskite compound by gelling a mixture of a sol of at least one A group element selected from the group consisting of Mg, Ca, Sr, Ba and Pb and a sol of at least one B group element selected from the group consisting of Ti, Zr, Hf and Sn, and then heating the obtained reaction product at a temperature in a range from 100° C. to 1400° C. to provide an aggregate of perovskite compound.

The second step is to heat the aggregate of perovskite compound thus obtained in the first step, in a solvent at a temperature in a range from 30° C. to 500° C., whereby disintegrating the aggregate.

Furthermore, the invention provides a process for production of powder of perovskite compound which comprises obtaining an aggregate of perovskite compound containing an additive for promoting or suppressing the growth of particles of perovskite compound in any of the first steps mentioned above.

BEST MODE FOR CARRYING OUT THE INVENTION

Figure 1:
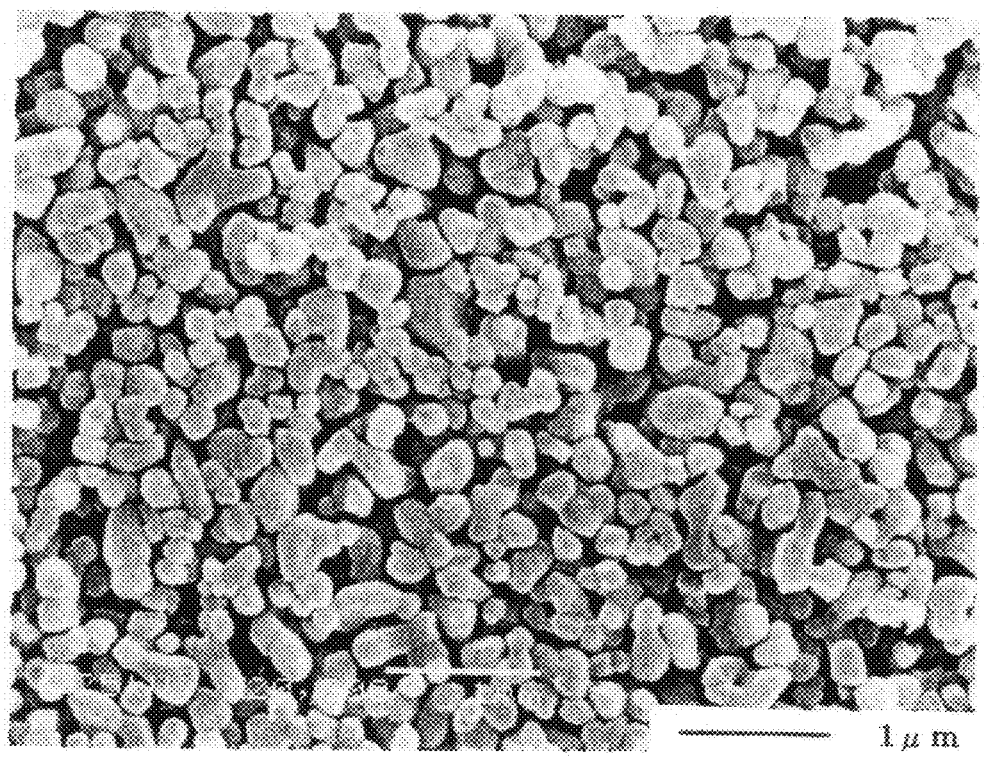
FIG. 1 is an electron micrograph of aggregate of barium titanate obtained in the first step in Example 1.

In the process for production of powder of perovskite compound of the invention, as the first step, a perovskite compound is firstly obtained as an aggregate formed by aggregation, fusion-bonding or sintering caused by heat treatment in the course of production of a perovskite compound by a hydrothermal process, a solid phase process, an organic acid salt process, an alkoxide process or a sol-gel process, and then, as the second step, the aggregate of perovskite compound is heated in a solvent at a temperature in a range from 30° C. to 500° C., whereby disintegrating the aggregate.

The aggregate of perovskite compound obtained in the first step may not be crushed by a media mill, an airflow crusher or another conventionally known crushing means, but it may be disintegrated as it is in the second step. Alternatively, the aggregate of perovskite compound obtained in the first step may be crushed by a conventional crushing means as mentioned above in advance, and then it may be disintegrated in the second step.

When the aggregate of perovskite compound is crushed by a conventional crushing means in advance as mentioned above, the aggregate is heated in the presence of a solvent in the second step to provide a powder which has a narrow particle size distribution since adhered particles or so-called necking particles are disintegrated, or chipping particles are dissolved so that they are re-precipitated on the surface of larger particles. On the other hand, when the aggregate is not crushed in advance by a conventional crushing means as mentioned above, the aggregate is disintegrated to provide a powder composed of primary particles without generation of chipping particles.

When a perovskite compound is produced by a hydrothermal process, a mixture of a hydroxide of at least one A group element selected from the group consisting of Mg, Ca, Sr, Ba and Pb and an oxide and/or a hydroxide of at least one B group element selected from the group consisting of Ti, Zr, Hf and Sn are subjected to hydrothermal treatment at a temperature in a range from 100° C. to 300° C. in the presence of an aqueous medium and the obtained reaction product is heated at a temperature in a range from 100° C. to 1400° C. to afford an aggregate of perovskite compound in the first step, and the aggregate is heated in a solvent at a temperature in a range from 30° C. to 500° C. in the second step, whereby disintegrating the aggregate.

When a perovskite compound is produced by a solid phase process, a mixture of an oxide of at least one A group element selected from the group consisting of Mg, Ca, Sr, Ba and Pb and/or a compound that forms the oxide by heating, and an oxide of at least one B group element selected from the group consisting of Ti, Zr, Hf and Sn and/or a compound that forms the oxide by heating is heated at a temperature in a range from 600° C. to 1400° C. to provide an aggregate of perovskite compound in the first step, and the aggregate is heated in a solvent at a temperature in a range from 30° C. to 500° C. in the second step, whereby disintegrating the aggregate. Examples of the compound that forms an oxide by heating include, for example, carbonates, hydroxides, nitrates, and organic acid salts.

When a perovskite compound is produced by an organic acid salt process, a double salt is formed using a water-soluble salt of at least one A group element selected from the group consisting of Mg, Ca, Sr, Ba and Pb, a water-soluble salt of at least one B group element selected from the group consisting of Ti, Zr, Hf and Sn, and at least one organic acid selected from the group consisting of oxalic acid and citric acid, and the double salt is then heated at a temperature in a range from 400° C. to 1400° C. to provide an aggregate of perovskite compound in the first step, and the aggregate is heated in a solvent at a temperature in a range from 30° C. to 500° C. in the second step, whereby disintegrating the aggregate.

When a perovskite compound is produced by an alkoxide process, a mixture of an alkoxide and/or a hydroxide of at least one A group element selected from the group consisting of Mg, Ca, Sr, Ba and Pb and an alkoxide of at least one B group element selected from the group consisting of Ti, Zr, Hf and Sn is hydrolyzed, and the obtained reaction product is heated at a temperature in a range from 100° C. to 1400° C. to provide an aggregate of perovskite compound in the first step, and the aggregate is then heated in a solvent at a temperature in a range from 30° C. to 500° C. in the second step, whereby disintegrating the aggregate When a perovskite compound is produced by a sol-gel process, a mixture of a sol of at least one A group element selected from the group consisting of Mg, Ca, Sr, Ba and Pb and a sol of at least one B group element selected from the group consisting of Ti, Zr, Hf and Sn is gelled, and the obtained reaction product is then heated at a temperature in a range from 100° C. to 1400° C. to provide an aggregate of perovskite compound in the first step, and the aggregate is then heated in a solvent at a temperature in a range from 30° C. to 500° C. in the second step, whereby disintegrating the aggregate.

Various processes for production of perovskite compound themselves are already well-known. According to the invention, a perovskite compound is obtained as an aggregate by such a conventionally well-known process, and the aggregate is heated in a solvent at a temperature in a range from 30° C. to 500° C., whereby the aggregate is disintegrated to provide a powder of perovskite compound having a high purity and a narrow particle size distribution.

Further according to the invention, when a perovskite compound is produced by any of the above-mentioned various processes, an additive that promotes or suppresses the growth of particles of perovskite compound generated is added to raw materials used for production of perovskite compound, and the perovskite compound is produced by using such raw materials as an aggregate, and the aggregate is disintegrated to provide a powder of perovskite compound having a desired average particle size. Namely, an additive that promotes or suppresses the growth of particles of perovskite compound generated is added to raw materials used for production of perovskite compound and the perovskite compound is obtained by using such raw materials as an aggregate in the first step, and the aggregate thus formed is heated in a solvent at a temperature in a range from 30 to 500° C. in the second step, whereby the aggregate is disintegrated to provide a powder of perovskite compound having a desired average particle size and a narrow particle size distribution.

According to an alternative process, an additive that promotes or suppresses the growth of particles of perovskite compound is in advance added to a perovskite compound produced, and the resulting mixture is heated to give an aggregate of perovskite compound, followed by disintegrating the aggregate, whereby providing a powder of perovskite compound having a desired average particles size. Namely, an additive that promotes or suppresses the growth of particles of perovskite compound is added in advance to a perovskite compound produced, and the resulting mixture is heated to give an aggregate of perovskite compound in the first step, and the aggregate thus formed is heated in a solvent at a temperature in a range from 30 to 500° C., whereby disintegrating the aggregate to provide a powder of perovskite compound having a desired average particle size and a narrow particle size distribution.

The additive to promote the growth of particles of perovskite compound or improves crystallinity of particles includes a so-called sintering aid, a particle growth promoter, a crystallization promoter, a flux agent, etc. Specific examples of such additives may include, although they are not limited to, oxides such as boric oxide, copper oxide, lead oxide, bismuth oxide, molybdenum oxide, etc., and halogenated compounds such as sodium fluoride, potassium fluoride, aluminum fluoride, sodium chloride, potassium chloride, barium chloride, strontium chloride, etc.

On the other hand, additives aiming at a contrast effect to those as mentioned above are also known, such as a so-called sintering inhibiting agent, a particle growth suppressor, etc. Specific examples of such additives include, although they are not limited to, niobium oxide, tantalum oxide, silicon oxide, aluminum oxide, zirconium oxide, etc.

Namely, according to the invention, the above-mentioned additive is in advance added to the perovskite compound produced in the first step, and the mixture is then subjected to heat treatment, for instance, in order to grow the particles, and the thus obtained aggregate is disintegrated to provide a powder having a desired average particles size.

In a conventional process of crushing the aggregate of perovskite compound, these additives remain between the particles (i.e., at grain boundaries) to adhere the particles. As a result, the particle size distribution of the obtained powder may be deteriorated, or the characteristics of products (e.g., dielectric ceramics) may be adversely affected. The same applies to excess components contained in raw materials used for the production of powder of perovskite compound.

However, according to the process of the invention, even when an aggregate of perovskite compound contains such additives as mentioned above, e.g., a sintering aid, a particle growth promoter, a crystallization promoter, a flux agent, a sintering inhibiting agent, a particle growth suppressor, such essentially unnecessary components as these additives or excess components in raw materials are dissolved in a solvent in the second step, and accordingly, such essentially unnecessary components can be removed from the perovskite compound. In this way, the process of the invention can not only dissociate and granulate adhered particles, but also improve purity of the perovskite compound obtained.

In particular, according to the invention, the above-mentioned effect can be further improved, for example, by adding a base such as potassium hydroxide and lithium hydroxide, an inorganic salt such as sodium chloride and potassium chloride, an organic acid salt such as ammonium acetate and sodium acetate, an inorganic acid such as hydrochloric acid, or an organic acid salt such as acetic acid, in order to increase the solubility of unnecessary components such as the additives and excess raw materials in a solvent in the second step, The solvent used in the invention may be either an organic solvent or an inorganic solvent, however, it is preferable to use a solvent having solubility that can dissolve the chipping particles of perovskite compound and the components at the grain boundaries of aggregate of perovskite compound. Water or a mixture of water and a water-miscible organic solvent is specifically preferred in view of easy handling. For example, when water is used as a solvent, water is used so that the concentration of the aggregate of perovskite compound in the resulting aqueous slurry is usually in the range of 0.1 mol/L to 5 mol/L (in terms of $ABO_3$).

The temperature at which an aggregate of perovskite compound is heated in such a solvent is generally in a range from 30° C. to 500° C., preferably in a range from 60° C. to 500° C., and most preferably in a range from 100° C. to 300° C. in view of efficiency and economical effect of the treatment.

According to the invention, it is preferable to add to the solvent a base such as an inorganic base (e.g., an alkali metal hydroxide and an alkaline earth metal hydroxide such as lithium hydroxide, sodium hydroxide, potassium hydroxide and barium hydroxide), an organic base (e.g., organic amine), an acid such as an inorganic acid (e.g., hydrochloric acid and nitric acid), an organic acid (e.g., oxalic acid, citric acid and tartaric acid), during such heat treatment in the second step in order to promote disintegration of aggregate of perovskite compound as well as dissolution and re-precipitation of chipping particles. A substance that acts as an acid or a base when it is added to a solvent may be added to the solvent. According to the invention, an aggregate of perovskite compound can be disintegrated more efficiently in this way by heating the aggregate of perovskite compound in a solvent in the presence of an acid or a base, preferably under stirring. However, stirring is not always necessary during heat treatment of aggregate of perovskite compound in a solvent.

In this way, according to the invention, an aggregate of perovskite compound is heated in a solvent, preferably under stirring, to dissolve the components present at grain boundaries of aggregate of perovskite compound, but also to dissolve microparticles so as to be precipitated on other particles to promote disintegration of the aggregate, whereby the perovskite compound can be obtained as a granulated powder. In such disintegration of aggregate of perovskite compound, it is desirable to use larger amount of base to be added to the solvent and a higher heat temperature in order to promote disintegration of aggregate, and dissolution and re-precipitation of microparticles. Furthermore, when such microparticles are repeatedly dissolved and re-precipitated, the particles can be grown. Therefore, the process of the invention makes it possible to dissociate and granulate the resulting particles of perovskite compound, but also to enlarge the size of the particles.

On the other hand, when a perovskite compound such as barium titanate is subjected to heat treatment during the production thereof, a barium component, one of the raw materials, is sometimes added in an excess amount over the stoichiometric amount so as to suppress the growth of particles to prevent abnormal particle growth. In this case, $Ba_2TiO_4$ is by-produced as a component at grain boundaries. According to the invention, the aggregate containing $Ba_2TiO_4$ is disintegrated in such a manner as mentioned above so that the undesirable byproducts can be simultaneously removed from barium titanate.

Furthermore, since an aggregate of perovskite compound is heated in a solvent, the microparticles of perovskite compound are dissolved in the solvent and removed due to re-precipitation on larger particles. As a result, a powder of granulated perovskite compound having a narrow particle size distribution can be obtained. Therefore, when an aggregate is crushed by a conventional crushing means in advance, the aggregate unavoidably includes chipping particles. However, even in such a case, the chipping particles can be removed and a powder of granulated perovskite compound can be obtained by disintegrating such aggregate according to the process of the invention.

When dielectric ceramic is produced using a powder of perovskite compound, a compound such as boron, bismuth, an alkaline metal (e.g., lithium, potassium and sodium), a rare earth element (e.g., yttrium, dysprosium, erbium and holmium), a transition metal (e.g., manganese, iron, cobalt and niobium), silicon and aluminum is sometimes added as an additive to the powder of perovskite compound in order to control the sintering properties of the powder, or the electronic properties of the sintered product. However, it goes without saying that such additives are incorporated in the perovskite compound when the aggregate of perovskite compound is disintegrated according to the invention. Further, such additives may be added to the solvent and the aggregate may be heated in a solvent. Alternatively, such additives may be added to the perovskite compound either before or after it is subjected to heat treatment.

INDUSTRIAL APPLICABILITY

According to the process of the invention, an aggregate of perovskite compound is heated in a solvent, whereby it is disintegrated to provide a powder of perovskite compound. Therefore, the resulting powder is neither contaminated with impurities derived from worn grinding media, nor contaminated with chipping particles derived from the perovskite compound itself. Accordingly, the process provides powder of perovskite compound having a high purity and a narrow particle size distribution.

Furthermore, also when an aggregate of perovskite compound is obtained by using raw materials to which an additive that promotes or suppresses the growth of particles of perovskite compound has been added, or also when an aggregate of perovskite compound is obtained by adding such additives to a perovskite compound that has been produced in advance and heating the resulting mixture, the thus obtained aggregate is heated in a solvent according to the invention, whereby disintegrating the aggregate, thereby providing a powder of perovskite compound that is neither contaminated with impurities derived from worn grinding media, nor contaminated with chipping particles derived from the perovskite compound itself. Accordingly, the process provides a powder of perovskite compound having a high purity and a narrow particle size distribution.

EXAMPLES

The invention is explained with referring to Examples and Comparative Examples, however, the invention should not be construed to be limited to these examples. Various physical properties of the particles were measured and photographs of the powder were taken as described below.

(Measurement of Average Particle Size)

A suitable amount of powder was added to an aqueous solution of sodium hexametaphosphate having a concentration of 0.025% by weight, and the mixture was dispersed using an ultrasonic homogenizer (US-600T, manufactured by Nissei Corporation) for 2 minutes to prepare a test solution. The particle size distribution of the test solution was measured using a particle size distribution measurement apparatus (Microtrac X-100, manufactured by Nikkiso Co., Ltd.).

(Measurement of Specific Surface Area)

The specific surface area was measured using BET-type Macsorb model-1203 (manufactured by Mountech Co., Ltd.).

(Measurement of Impurities in Powder of Perovskite Compound)

Impurities were measured using a plasma emission spectrometer (SPS3000, manufactured by Seiko Instruments, Inc.).

(Taking Photographs of Powder)

Photographs of the powder were taken using a scanning electromicroscope JSM-5600 (manufactured by JEOL Ltd.).

Example 1

Production of Barium Titanate Powder by Hydrothermal Process

First Step 157.5 g (0.5 mols as barium) of barium hydroxide octahydrate ($Ba(OH)_2 \cdot 8H_2O$) was added to 131.5 g of titanium hydroxide (30% by weight as titanium oxide and 0.5 mols as titanium) under a nitrogen atmosphere. Water was added to the resulting slurry to adjust the concentration to 1.0 mol/L (as $BaTiO_3$). The slurry was placed in a titanium beaker and the beaker was placed in a 1 L capacity autoclave. The slurry was heated to 200° C. at a rate of 100° C./hr while it was stirred at 550 to 600 rpm to carry out a hydrothermal reaction at a temperature of 200° C. for 5 hours. After the completion of the reaction, carbon dioxide gas was blown into the slurry until the pH reached 6.5. The slurry was then washed with water, and solid was collected by filtration and dried at a temperature of 110° C. to provide barium titanate. Hereinafter the barium titanate obtained in this Example is referred to "barium titanate obtained by a hydrothermal process in Example 1". The barium titanate was heated to provide an aggregate of barium titanate having a specific surface area of 4.4 $m^2/g$.

Second Step

The aggregate of barium titanate was placed as it was in a titanium beaker. To the aggregate of barium titanate was added barium hydroxide in an equimolar amount with the barium titanate under a nitrogen atmosphere. Water was added to the resulting mixture to prepare a slurry having a concentration to 0.3 mol/L (as $BaTiO_3$). The slurry was placed in a 1 L capacity autoclave. The slurry was heated to 200° C. at a rate of 100° C./hr while it was stirred at 200 to 250 rpm, and the slurry was maintained at the temperature for 2 hours. The slurry was then filtered, washed with water, dried at a temperature of 110° C., and milled in an agate mortar to provide a powder.

The thus obtained powder was confirmed to be barium titanate by X-ray diffraction measurement and fluorescent X-rays measurement. The powder of barium titanate was found to have an average particle size of 0.5 µm as a result of measurement of particle size distribution. The specific surface area was found to be 5.3 $m^2/g$.

Figure 2:
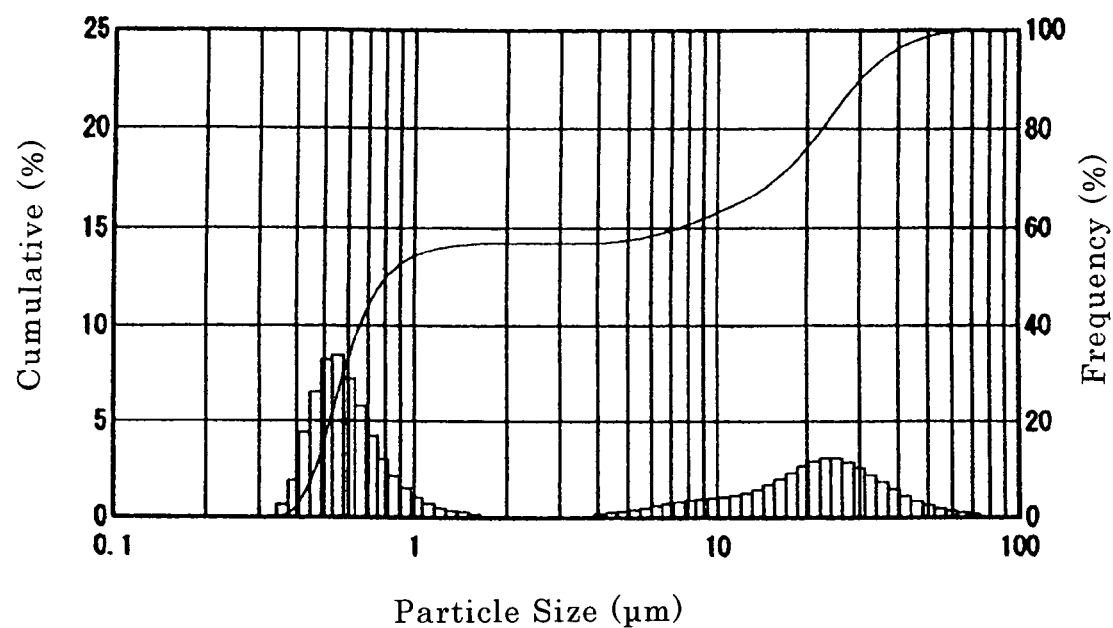
FIG. 2 is a graph showing particle size distribution of aggregate of barium titanate obtained in the first step in Example 1.
Figure 3:
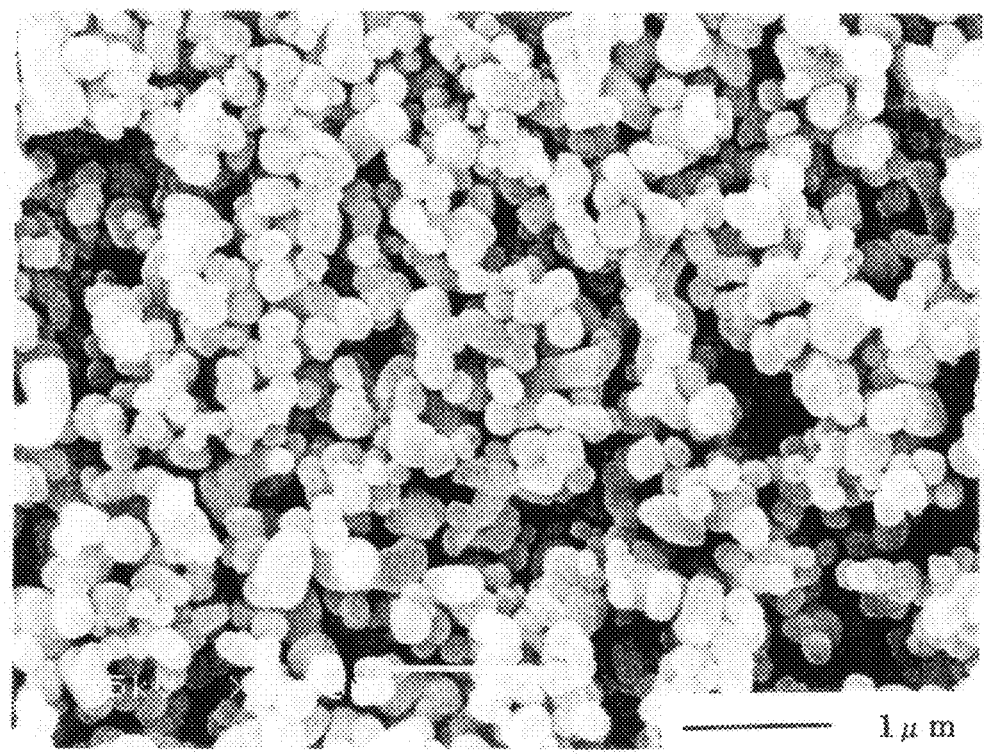
FIG. 3 is an electron micrograph of barium titanate obtained in the second step in Example 1.
Figure 4:
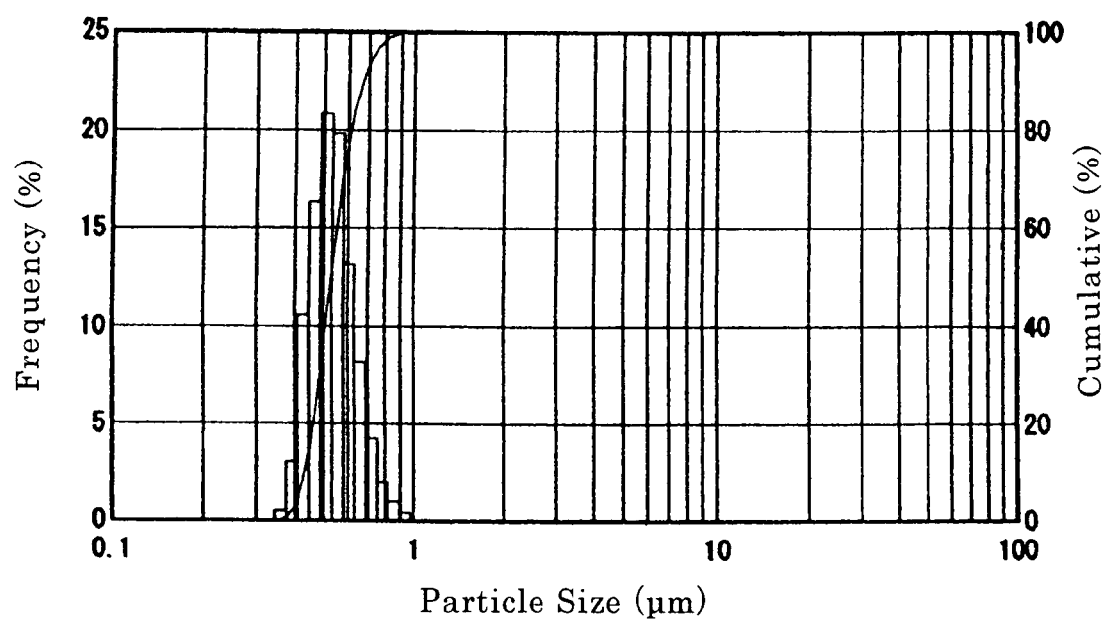
FIG. 4 is a graph showing particle size distribution of barium titanate obtained in the second step in Example 1.

The electron micrograph of the aggregate of barium titanate obtained in the first step is shown in FIG. 1, and the particle size distribution thereof is shown in FIG. 2. The electron micrograph of the powder of barium titanate obtained in the second step is shown in FIG. 3, and the particle size distribution thereof is shown in FIG. 4.

Example 2

Production of Barium Titanate Powder by Solid Phase Process

First Step

Equimolar amounts of high purity barium carbonate and high purity titanium oxide (both available from Sakai Chemical Industry Co., Ltd) were weighed, and wet-mixed using a polyethylene pot mill with nylon balls having iron cores. The mixture was dried and heated at a temperature of 1200° C. for 2 hours to provide an aggregate of barium titanate. The specific surface area of the aggregate was 1.2 $m^2/g$.

Second Step

The aggregate of barium titanate was crushed in an agate mortar and placed in a titanium beaker. To the aggregate of barium titanate was added barium hydroxide in an equimolar amount with the barium titanate under a nitrogen atmosphere. Water was added to the resulting mixture to prepare a slurry having a concentration to 1.0 mol/L (as $BaTiO_3$). The slurry was placed in a 1 L capacity autoclave. The slurry was heated to a temperature of 250° C. at a rate of 100° C./hr while it was stirred at 550 to 600 rpm, and the slurry was maintained at the temperature for 5 hours. The slurry was filtered, washed with water, dried at a temperature of 110° C., and milled in an agate mortar to provide a powder.

The thus obtained powder was confirmed to be barium titanate by X-ray diffraction measurement and fluorescent X-rays measurement. The powder of barium titanate was found to have an average particle size of 1.0 µm as a result of measurement of particle size distribution. The specific surface area was found to be 1.7 $m^2/g$.

Figure 5:
FIG. 5 is an electron micrograph of aggregate of barium titanate obtained in the first step in Example 2.
Figure 6:
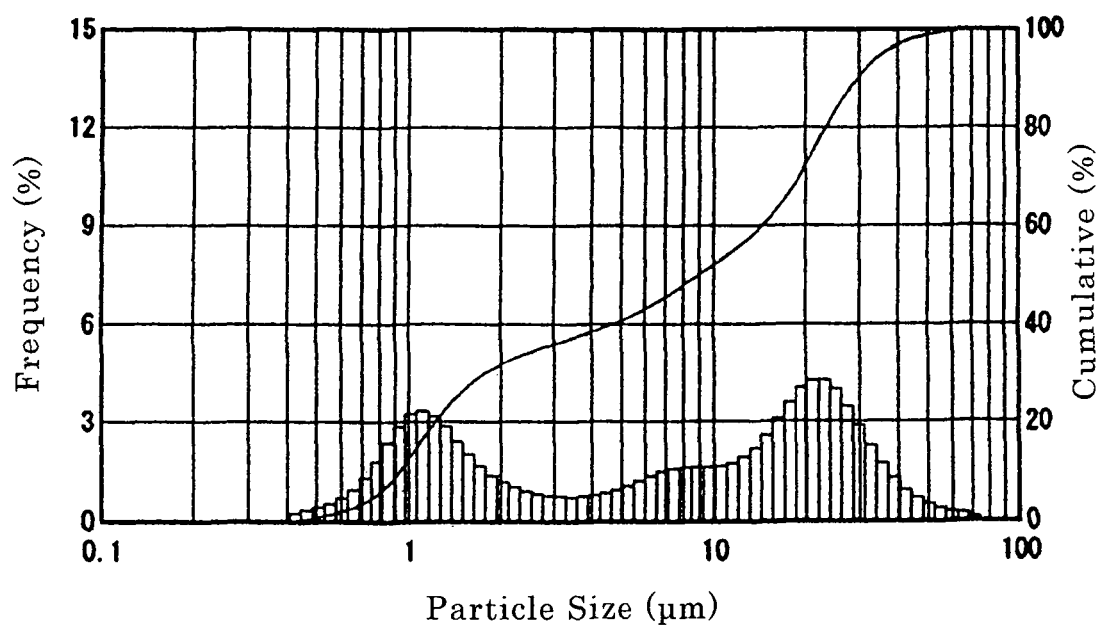
FIG. 6 is a graph showing particle size distribution of aggregate of barium titanate obtained in the first step in Example 2.
Figure 7:
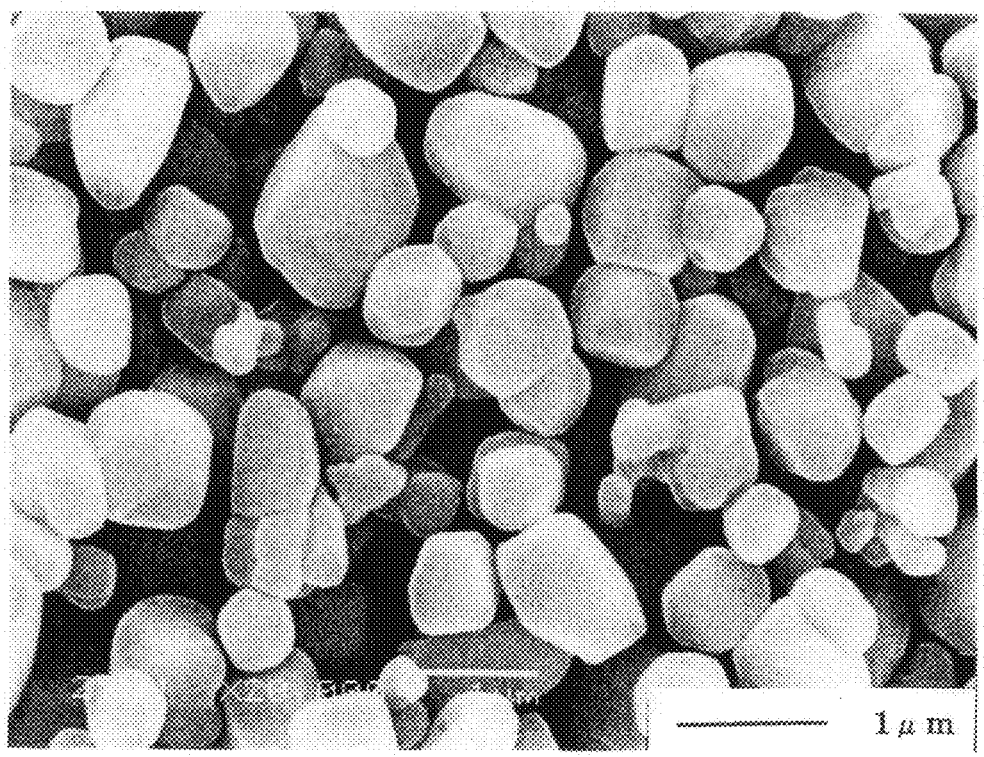
FIG. 7 is an electron micrograph of barium titanate obtained in the second step in Example 2.
Figure 8:
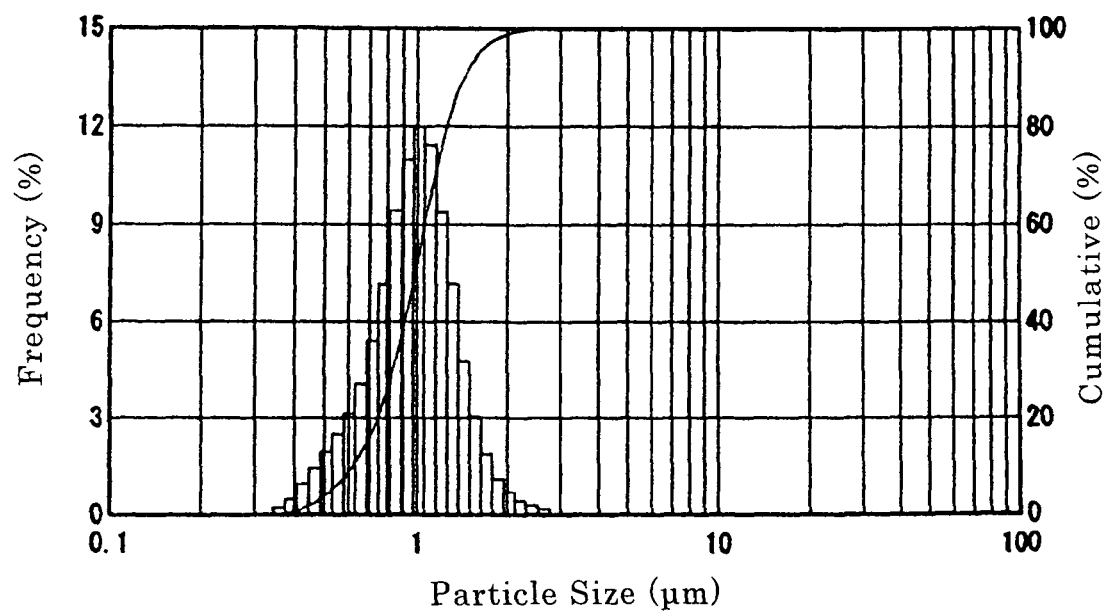
FIG. 8 is a graph showing particle size distribution of barium titanate obtained in the second step in Example 2.

The electron micrograph of the aggregate of barium titanate obtained in the first step is shown in FIG. 5, and the particle size distribution thereof is shown in FIG. 6. The electron micrograph of the powder of barium titanate obtained in the second step is shown in FIG. 7, and the particle size distribution thereof is shown in FIG. 8.

Example 3

Production of Barium Titanate Powder by Organic Acid Salt Process

First Step 450 mL of aqueous solution of barium chloride having a concentration of 267.3 g/L (as barium chloride) was added to 450 mL of aqueous solution of titanium tetrachloride having a concentration of 50 g/L (as titanium) to prepare a mixed solution. The mixed solution was added to 900 mL of aqueous solution of oxalic acid having a concentration of 144.7 g/L (as oxalic acid dihydrate) maintained at a temperature of 70° C.

to provide barium titanyl oxalate. The barium titanyl oxalate was washed with water, dried at a temperature of 130° C., and then heated at a temperature of 860° C. for 2 hours to provide an aggregate of barium titanate. The specific surface area of the aggregate was found to be 7.9 m$^2$/g.

Second Step

The aggregate of barium titanate was crushed in an agate mortar and placed in a titanium beaker. To the aggregate of barium titanate was added barium hydroxide in an equimolar amount with the barium titanate under a nitrogen atmosphere. Water was added to the resulting mixture to prepare a slurry having a concentration of 1.0 mol/L (as BaTiO$_3$). The slurry was placed in a 1 L capacity autoclave. The slurry was heated to a temperature of 200° C. at a rate of 100° C./hr while it was stirred at 550 to 600 rpm, and the slurry was maintained at the temperature for 2 hours. The slurry was then filtered, washed with water, dried at a temperature of 110° C., and milled in an agate mortar to provide a powder.

The thus obtained powder was confirmed to be barium titanate by X-ray diffraction measurement and fluorescent X-rays measurement. The powder of barium titanate was found to have an average particle size of 3.8 μm as a result of measurement of particle size distribution. The specific surface area was found to be 7.2 m$^2$/g.

Example 4

First Step

To the barium titanate obtained by hydrothermal process in Example 1 was added high purity barium carbonate (available from Sakai Chemical Industry Co., Ltd.) in an amount of 0.3 mol % in relation to the barium titanate as an excess raw material. The resulting mixture was wet-mixed in a polyethylene pot mill with zirconia balls and heated to provide an aggregate of barium titanate having a specific surface area of 1.4 m$^2$/g. The X-ray diffraction of the aggregate showed peaks of orthobarium titanate (Ba$_2$TiO$_4$) in addition to the peaks of barium titanate.

Second Step

The aggregate of barium titanate was as it was placed in a titanium beaker. To the aggregate of barium titanate was added barium hydroxide in an equimolar amount with the barium titanate under a nitrogen atmosphere. Water was added to the resulting mixture to prepare a slurry having a concentration to 0.3 mol/L. The slurry was placed in a 1 L capacity autoclave. The slurry was heated to a temperature of 200° C. at a rate of 100° C./hr while it was stirred at 200 to 250 rpm, and then maintained at the temperature for 2 hours. The slurry was filtered, washed with water, dried at a temperature of 110° C., and crushed in an agate mortar to provide a powder.

In the X-ray diffraction of the powder, no peaks due to Ba$_2$TiO$_4$ were observed. The powder was confirmed to be barium titanate by fluorescence X-ray measurement. The specific surface area of the powder of barium titanate was 2.0 m$^2$/g.

Example 5

First Step

To the barium titanate obtained by hydrothermal process in Example 1 was added barium chloride dihydrate (available from Sakai Chemical Industry Co., Ltd.) as a particle growth promoter in an amount of 1 mol % in relation to the barium titanate. The resulting mixture was wet-mixed using a polyethylene pot mill, spray-dried, and heated to provide an aggregate of barium titanate having a specific surface area of 4.2 m$^2$/g.

Second Step

The aggregate of barium titanate was placed as it was in a titanium beaker. To the aggregate of barium titanate was added barium hydroxide in an amount 1.5 times in mols as much as the barium titanate under a nitrogen atmosphere. Water was added to the resulting mixture to prepare a slurry having a concentration of 0.3 mol/L. The slurry was placed in a 1 L capacity autoclave. While the slurry was stirred at a rate of 200-250 rpm, it was heated to a temperature of 200° C. at a rate of 100° C./hr, and then maintained at the temperature for 2 hours. The slurry was then filtered, washed with water, dried at a temperature of 110° C., and milled in an agate mortar to provide a powder.

The thus obtained powder was confirmed to be barium titanate by X-ray diffraction measurement and fluorescent X-rays measurement. The powder of barium titanate was found to have an average particle diameter of 0.6 μm as a result of particle size distribution measurement. The specific surface area was found to be 4.6 m$^2$/g. The chlorine content in the barium titanate was found to be not more than 100 ppm as measured by a fluorescent X-rays analyzer.

Example 6

First Step

To the barium titanate obtained by hydrothermal process in Example 1 was added silicon oxide as a particle growth suppressor in an amount of 0.3% by weight in relation to the barium titanate. The resulting mixture was wet-mixed in a polyethylene pot mill. The mixture was spray dried and heated to provide an aggregate of barium titanate having a specific surface area of 6.2 m$^2$/g.

Second Step

The aggregate of barium titanate was as it was placed in a titanium beaker. To the aggregate of barium titanate was added barium hydroxide in an equimolar amount with the barium titanate under a nitrogen atmosphere. Water was added to the resulting mixture to prepare a slurry having a concentration of 0.4 mol/L. The slurry was placed in a 200 mL capacity autoclave. While the slurry was stirred at a rate of 200-250 rpm, it was heated to a temperature of 200° C. at a rate of 100° C./hr, and then maintained at the temperature for 2 hours. Thereafter, the slurry was filtered, washed with water, dried at a temperature of 110° C., and milled in an agate mortar to provide a powder.

The thus obtained powder was confirmed to be barium titanate by X-ray diffraction measurement and fluorescent X-rays measurement. The powder of barium titanate was found to have an average particle diameter of 0.5 μm as a result of particle size distribution measurement. The specific surface area was found to be 6.5 m$^2$/g. The silicon oxide content in the barium titanate was found to be 900 ppm as measured using a plasma emission spectrometer.

Example 7

Production of Powder of Calcium Zirconate by Solid Phase Process

First Step

Equimolar amounts of high purity calcium carbonate and zirconium oxide (both available from Sakai Chemical Industry Co., Ltd.) were weighed and wet-mixed in a polyethylene pot mill with zirconia balls. The resulting mixture was dried and heated at a temperature of 1150° C. for 2 hours to provide an aggregate of calcium zirconate having a specific surface area of 3.0 m$^2$/g.

Second Step

After the aggregate of calcium zirconate was crushed in an agate mortar, it was placed in a titanium beaker. To the aggregate of calcium zirconate was added sodium hydroxide in an equimolar amount with the calcium zirconate. Water was added to the resulting mixture to prepare a slurry having a concentration of 1.0 mol/L. The slurry was placed in a 1 L capacity autoclave. While the slurry was stirred at a rate of 400-450 rpm, it was heated to a temperature of 250° C. at a rate of 100° C./hr, and then maintained at the temperature for 5 hours. The slurry was then filtered, washed with water, dried at a temperature of 110° C., and milled in an agate mortar to provide a powder.

The thus obtained powder was confirmed to be calcium zirconate by X-ray diffraction measurement and fluorescent X-rays measurement. The powder of calcium zirconate was found to have an average particle diameter of 1.2 μm as a result of particle size distribution measurement. The specific surface area was found to be 3.3 m$^2$/g.

Example 8

Production of Powder of Magnesium Titanate by Solid Phase Process

First Step

Equimolar amounts of high purity magnesium oxide and titanium oxide (both available from Sakai Chemical Industry Co., Ltd.) were weighed and wet-mixed in a polyethylene pot mill with zirconia balls. The resulting mixture was dried and heated at a temperature of 850° C. for 2 hours to provide an aggregate of magnesium titanate having a specific surface area of 2.5 m$^2$/g.

Second Step

After the aggregate of magnesium titanate was crushed in an agate mortar, it was placed in a titanium beaker. To the aggregate of magnesium titanate was added sodium hydroxide in an equimolar amount with the magnesium titanate. Water was added to the resulting mixture to prepare a slurry having a concentration of 1.0 mol/L. The slurry was placed in a 1 L capacity autoclave. While the slurry was stirred at a rate of 100-150 rpm, it was heated to a temperature of 220° C. at a rate of 100° C./hr, and then maintained at the temperature for 5 hours. The slurry was then filtered, washed with water, dried at a temperature of 110° C., and milled in an agate mortar to provide a powder.

The thus obtained powder was confirmed to be magnesium titanate by X-ray diffraction measurement and fluorescent X-rays measurement. The powder of magnesium titanate was found to have an average particle diameter of 4.2 μm as a result of particle size distribution measurement. The specific surface area was found to be 2.9 m$^2$/g.

Example 9

Production of Powder of Strontium Titanate by Hydrothermal Process

First Step 132.9 g (0.5 mols as strontium) of strontium hydroxide octahydrate ($Sr(OH)_2.8H_2O$) was added to 131.5 g (0.5 mols as titanium and 30% by weight as titanium oxide) of titanium hydroxide under a nitrogen atmosphere. Water was added to the resulting slurry so that it had a concentration of 1.0 mol/L (as $SrTiO_3$). The slurry was placed in a titanium beaker and the beaker was placed in a 1 L capacity autoclave. While the slurry was stirred at a rate of 550-600 rpm, it was heated to a temperature of 200° C. at a rate of 100° C./hr and hydrothermal reaction was carried out at a temperature of 200° C. for 5 hours. After the reaction, carbon dioxide gas was blown into the slurry until the pH of the slurry reached 6.5, followed by washing with water, filtering and drying a temperature of 110° C. to provide strontium titanate. The strontium titanate was heated to provide aggregate having a specific surface area of 2.5 m$^2$/g.

Second Step

The aggregate of strontium titanate was as it was placed in a titanium beaker. To the aggregate of strontium titanate was added strontium hydroxide in an equimolar amount with the strontium titanate under a nitrogen atmosphere. Water was added to the resulting mixture so that the resulting slurry had a concentration of 0.5 mol/L. The slurry was placed in a 1 L capacity autoclave. While the slurry was stirred at a rate of 550-600 rpm, it was heated to a temperature of 200° C. at a rate of 100° C./hr, and then maintained at the temperature for 5 hours. The slurry was then filtered, washed with water, dried at a temperature of 110° C., and milled in an agate mortar to provide a powder.

The thus obtained powder was confirmed to be strontium titanate by X-ray diffraction measurement and fluorescent X-rays measurement. The powder of calcium zirconate was found to have an average particle diameter of 0.7 μm as a result of particle size distribution measurement. The specific surface area was found to be 3.0 m$^2$/g.

Example 10

Production of Powder of Barium Calcium Titanate Zirconate by Solid Phase Process First Process High purity barium carbonate, calcium carbonate, titanium oxide and zirconium oxide were weighed so that they had a Ba:Ca:Ti:Zr molar ratio of 0.95:0.05:0.9:0.1. The resulting mixture was wet-mixed in a polyethylene pot mill with zirconia balls. The resulting mixture was dried and heated at a temperature of 1000° C. for 2 hours to provide an aggregate of barium calcium titanate zirconate having a specific surface area of 3.1 m$^2$/g.

Second Step

After the aggregate of barium calcium titanate zirconate was crushed in an agate mortar, it was placed in a titanium beaker. To the aggregate of barium calcium titanate zirconate was added barium hydroxide in an equimolar amount with the barium calcium titanate zirconate. Water was added to the resulting mixture so that the resulting slurry had a concentration of 1.0 mol/L. The slurry was placed in a 1 L capacity autoclave. While the slurry was stirred at a rate of 200-250 rpm, it was heated to a temperature of 180° C. at a rate of 100° C./hr, and then maintained at the temperature for 20 hours. The slurry was then filtered, washed with water, dried at a temperature of 110° C., and milled in an agate mortar to provide a powder.

The thus obtained powder was confirmed to be barium calcium titanate zirconate by X-ray diffraction measurement and fluorescent X-rays measurement. The powder of barium calcium titanate zirconate was found to have an average particle diameter of 0.8 μm as a result of particle size distribution measurement. The specific surface area was found to be 4.0 m$^2$/g.

Example 11

Production of Powder of Barium Titanate by Solid Phase Process

First Process

Equimolar amounts of high purity barium carbonate and high purity titanium oxide (both available from Sakai Chemical Industry Co., Ltd.) were weighed. Sodium chloride was added as a particle growth promoter to the mixture in an amount of 0.1% by weight based on the total of barium carbonate and titanium oxide. The resulting mixture was further wet-mixed in a polyethylene pot mill with zirconia balls. The mixture was spray dried and heated at a temperature of 1150° C. for 2 hours to provide an aggregate of barium titanate having a specific surface area of 1.1 m$^2$/g.

Second Step

After the aggregate of barium titanate was crushed in an agate mortar, it was placed in a titanium beaker. To the aggregate of barium titanate was added barium hydroxide in an equimolar amount with the barium titanate. Water was added to the resulting mixture so that the resulting slurry had a concentration of 1.0 mol/L. The slurry was placed in a 1 L capacity autoclave. While the slurry was stirred at a rate of 550-600 rpm, it was heated to a temperature of 250° C. at a rate of 100° C./hr, and then maintained at the temperature for 3 hours. The slurry was then filtered, washed with water, dried at a temperature of 110° C., and milled in an agate mortar to provide a powder.

The thus obtained powder was confirmed to be barium titanate by X-ray diffraction measurement and fluorescent X-rays measurement. The powder of barium titanate was found to have an average particle diameter of 1.1 μm as a result of particle size distribution measurement. The specific surface area was found to be 1.3 m$^2$/g. The sodium content in the barium titanate was found to be 150 ppm as measured using a plasma emission spectrometer.

Example 12

First Step

Polyvinyl alcohol was added to the barium titanate obtained by hydrothermal process in Example 1. The resulting mixture was granulated and then formed to a molding having a diameter of 20 mm and a thickness of 2 mm. The molding was heated at a temperature of 1400° C. for 4 hours to provide a sintered product in the form of tablet.

Second Step

The sintered product was placed in a titanium beaker. Barium hydroxide in an amount 8 times in moles as much as the barium titanate in the sintered product was added under a nitrogen atmosphere. Water was added to the resulting mixture to prepare a slurry. The slurry was placed in a 200 mL capacity autoclave. The slurry was heated to a temperature of 250° C. at a rate of 100° C./hr, and then maintained at the temperature for 50 hours without stirring. Then, the slurry was filtered, washed with water, dried at a temperature of 110° C., and milled in an agate mortar to provide a powder.

Figure 9:
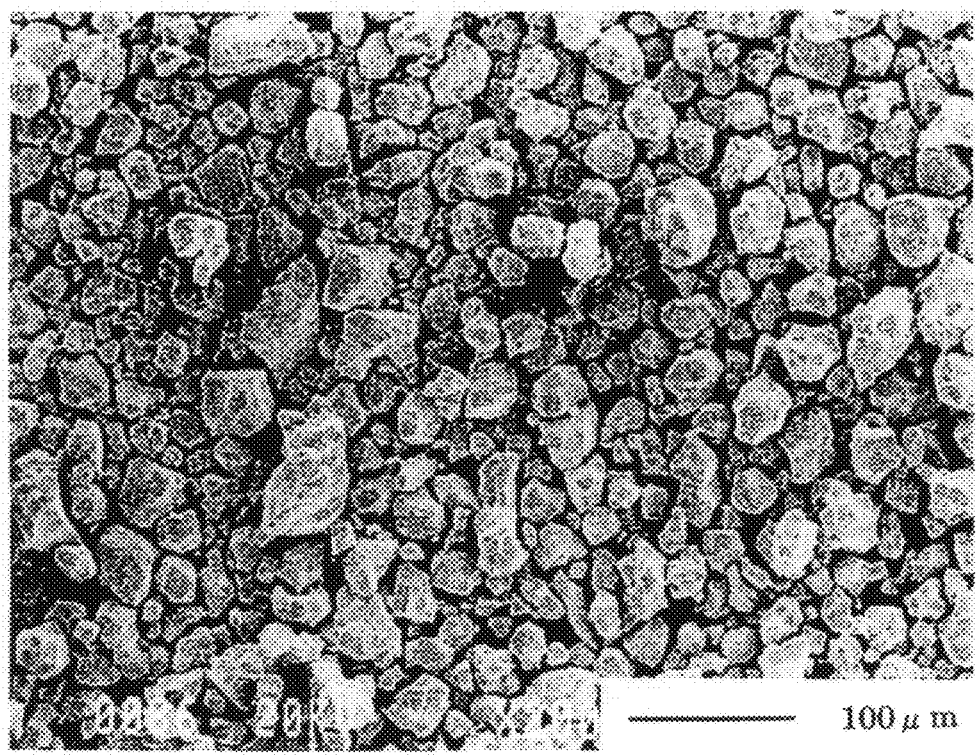
FIG. 9 is an electron micrograph of barium titanate obtained in the second step in Example 12.

The thus obtained powder was confirmed to be barium titanate by X-ray diffraction measurement and fluorescent X-rays measurement. The powder of barium titanate was found to have an average particle diameter of 40 μm as a result of particle size distribution measurement. The specific surface area was found to be 0.11 m$^2$/g. FIG. 9 is an electron micrograph of powder of barium titanate obtained in this way.

Example 13

Production of Powder of Barium Titanate by Alkoxide Process

First Step

On the one hand barium metal was dissolved under a nitrogen atmosphere in isopropyl alcohol that had been dehydrated at a temperature of 80° C. to prepare a solution of barium isopropoxide having a concentration of 0.2 mol/L, and on the other hand, titanium isopropoxide was dissolved in dehydrated isopropyl alcohol under a nitrogen atmosphere to prepare a solution of titanium isopropoxide having a concentration of 1.0 mol/L.

The solutions of barium isopropoxide and titanium isopropoxide were weighed into a beaker so that they had a Ba/Ti molar ratio of 1/1. The mixture was refluxed with stirring for 2 hours under a nitrogen atmosphere. Decarbonized distilled water was added slowly to the reaction mixture, aged for three hours, and cooled to room temperature, thereby providing barium titanate. The thus obtained barium titanate was heated to provide an aggregate of barium titanate having a specific surface area of 2.5 m$^2$/g.

Second Step

The aggregate of barium titanate was as it was placed in a titanium beaker. To the aggregate of barium titanate was added barium hydroxide in an equimolar amount with the barium titanate under a nitrogen atmosphere. Water was added to the resulting mixture to prepare a slurry having a concentration of 0.3 mol/L (as BaTiO$_3$). The slurry was placed in a 1 L capacity autoclave. While the slurry was stirred at a rate of 200-250 rpm, it was heated to a temperature of 200° C. at a rate of 100° C./hr, and then maintained at the temperature for 2 hours. The slurry was then filtered, washed with water, dried at a temperature of 110° C., and milled in an agate mortar to provide a powder.

The powder thus obtained was confirmed to be barium titanate by X-ray diffraction measurement and fluorescent X-rays measurement. The powder of barium titanate was found to have an average particle diameter of 0.7 μm as a result of particle size distribution measurement. The specific surface area was found to be 3.1 m²/g.

Comparative Example 1

The aggregate of barium titanate obtained in the first step in Example 2 was found to contain 8 ppm of zirconium derived from impurities contained in the raw materials used as measured using a plasma emission spectrometer.

Figure 10:
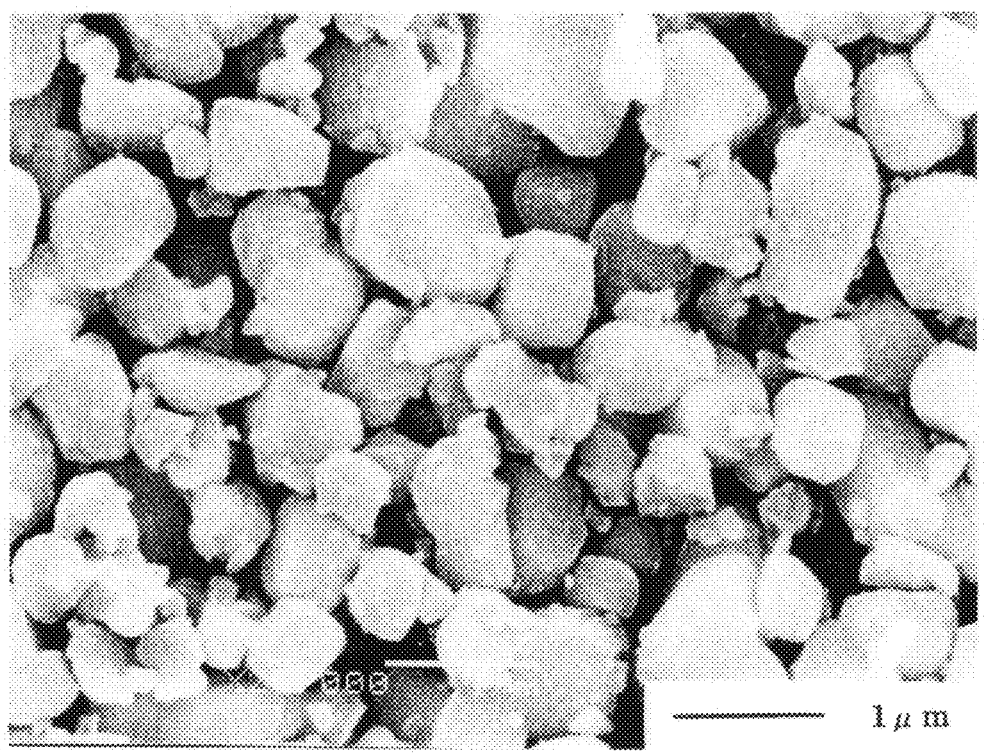
FIG. 10 is an electron micrograph of powder of barium titanate obtained by wet-milling an aggregate of barium titanate using zirconia beads as milling media in Comparative Example 1.
Figure 11:
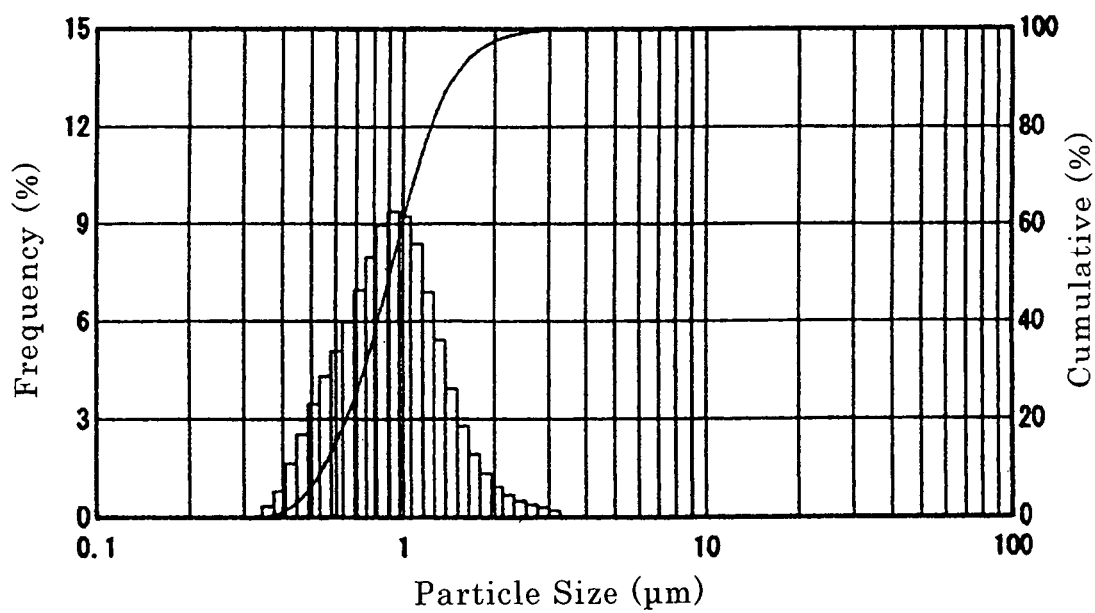
FIG. 11 is a graph showing particle size distribution of powder of barium titanate obtained by wet-milling an aggregate of barium titanate using zirconia beads as milling media in Comparative Example 1.

The aggregate of barium titanate was placed in a nylon pot containing zirconia balls and then wet-milled using a planetary ball mill manufactured by Fritsch (Germany). The powder obtained in this way was confirmed to be barium titanate by X-ray diffraction measurement and fluorescent X-rays measurement. The powder of barium titanate was found to have an average particle diameter of 0.8 µm as a result of particle size distribution measurement. The specific surface area was found to be 2.8 m²/g. The zirconium content in the barium titanate was found to be 630 ppm as measured using a plasma emission spectrometer. FIG. 10 is an electron micrograph and FIG. 11 is a particle size distribution of powder of barium titanate obtained in this way.

Comparative Example 2

The aggregate of barium titanate obtained in the first step in Example 1 was placed in a glass beaker. Water was added to the aggregate so that the resulting slurry had a concentration of 0.1 mol/L. After the slurry was stirred at a temperature of 20° C. for 5 hours with stirring, it was filtered, washed with water, dried at a temperature of 110° C., and milled in an agate mortar to provide a powder. The thus obtained powder was subjected to measurement of particle size distribution and specific surface area. As a result, it was found to be what it was before it was subjected to heat treatment as the particle size distribution and the specific surface area were found to be the same as those of the aggregate before they were heat-treated.

The invention claimed is:

1. A process for production of powder of a perovskite compound which comprises:
   a first step by a hydrothermal process, an alkoxide process, or a sol-gel process for obtaining an aggregate of perovskite compound, which comprises at least one A group element selected from the group consisting of Mg, Ca, Sr, Ba and Pb and at least one B group element selected from the group consisting of Ti, Zr, Hf and Sn, and which is represented by a formula

ABO₃, wherein A is at least one A group element and B is at least one B group element; and
   a second step for heating the aggregate of perovskite compound, which is obtained in the first step, in an aqueous solution containing at least one base selected from the group consisting of an alkali metal hydroxide, an alkaline earth metal hydroxide, and an organic amine, at a temperature in a range from 180° C. to 500° C. in absence of grinding media, thereby disintegrating the aggregate,
   wherein in the second step, the base in the aqueous solution has been added after the aggregate of perovskite compound is formed.

2. The process according to claim 1, in which the first step is conducted by the hydrothermal process and the hydrothermal process comprises:
   heating a mixture of a hydroxide of at least one A group element selected from the group consisting of Mg, Ca, Sr, Ba and Pb and at least one material selected from the group consisting of an oxide and a hydroxide of at least one B group element selected from the group consisting of Ti, Zr, Hf and Sn at a temperature in the range of 100-300° C. in the presence of an aqueous solvent; and
   heating the obtained reaction product at a temperature in the range of 100-1400° C. and obtaining the aggregate of perovskite compound.

3. The process according to claim 1, in which the first step is conducted by the alkoxide process and the alkoxide process comprises:
   hydrolyzing a mixture of at least one material selected from the group consisting of an alkoxide and a hydroxide of at least one A group element selected from the group consisting of Mg, Ca, Sr, Ba, and Pb and an alkoxide of at least one B group element selected from the group consisting of Ti, Zr, Hf and Sn; and
   then heating the resultant reaction product at a temperature in the range of 100-1400° C. and obtaining the aggregate of perovskite compound.

4. The process according to claim 1, in which the first step is conducted by the sol-gel process and the sol-gel process comprises:
   gelling a mixture of a sol of at least one A group element selected from the group consisting of Mg, Ca, Sr, Ba, and Pb and a sol of at least one B group element selected from the group consisting of Ti, Zr, Hf and Sn; and
   then heating the resultant reaction product at a temperature in the range of 100-1400° C. and obtaining the aggregate of perovskite compound.

5. The process according to claim 1, in which in the first step, the aggregate of perovskite compound contains an additive that promotes or suppresses growth of a particle of the perovskite compound so as to control a size of the particle.

6. The process according to claim 1, in which the alkali metal hydroxide is at least one hydroxide selected from the group consisting of lithium hydroxide, sodium hydroxide, and potassium hydroxide.

7. The process according to claim 1, in which the alkaline earth metal hydroxide is at least one hydroxide selected from the group consisting of barium hydroxide and strontium hydroxide.

* * * * *